(12) United States Patent
Shumway

(10) Patent No.: US 6,537,035 B2
(45) Date of Patent: Mar. 25, 2003

(54) PRESSURE EXCHANGE APPARATUS

(76) Inventor: Scott Shumway, 764 Leavensworth Rd., Hinesburg, VT (US) 05461

( * ) Notice: Subject to any disclaimer, the term of this patent is extended or adjusted under 35 U.S.C. 154(b) by 0 days.

(21) Appl. No.: 09/832,352

(22) Filed: Apr. 10, 2001

(65) Prior Publication Data

US 2002/0146325 A1 Oct. 10, 2002

(51) Int. Cl.[7] ................................................ F04F 11/00
(52) U.S. Cl. ........................................................ 417/64
(58) Field of Search ............................................ 417/64

(56) References Cited

U.S. PATENT DOCUMENTS

| | | | | |
|---|---|---|---|---|
| 2,968,435 A | * | 1/1961 | Jendrassik | 230/69 |
| 3,109,580 A | * | 11/1963 | Kentifield | 230/69 |
| 3,120,919 A | * | 2/1964 | Gardiner | 230/69 |
| 3,209,986 A | * | 10/1965 | Kentifield | 230/69 |
| 3,431,747 A | | 3/1969 | Hashemi et al. | 62/123 |
| 3,489,159 A | | 1/1970 | Cheng et al. | 137/14 |
| 4,170,107 A | * | 10/1979 | Horler | 60/39.45 |
| 4,471,795 A | | 9/1984 | Linhardt | 137/14 |
| 4,679,393 A | | 7/1987 | Hellat et al. | 60/39.45 |
| 4,887,942 A | | 12/1989 | Hauge | 417/64 |
| 5,338,158 A | | 8/1994 | Hauge | 417/64 |
| 5,988,993 A | | 11/1999 | Hauge | 417/365 |

* cited by examiner

Primary Examiner—Cheryl J. Tyler
Assistant Examiner—W Rodriguez
(74) Attorney, Agent, or Firm—Eric Spencer

(57) ABSTRACT

A pressure exchange apparatus for transferring the energy of pressurization between two fluids, wherein one fluid is at a relatively higher pressure than the other comprising a rotating cylindrical rotor having a bore extending therethrough in fluid communication with an inlet and an outlet.

14 Claims, 5 Drawing Sheets

PRESSURE EXCHANGE APPARATUS

BACKGROUND OF THE INVENTION

1. Field of the Invention

This invention relates to pressure exchangers for transfer of energy from one liquid flow to another. More specifically, this invention relates to pressure exchangers for the transfer of energy from one liquid stream to another using a rotating rotor.

2. Summary of the Prior Art

The present invention provides a device which can be appropriately described as an engine for exchanging pressure energy between relatively high and relatively low pressure fluid systems, which the term fluid being defined here as including gases, liquids and pumpable mixtures of liquids and solids. The engine for pressure energy exchange of the present invention is a highly efficient device with well over 90% of the energy of pressurization in a pressurized fluid system being transferred to a fluid system at a lower pressure. The device employed for achieving this highly efficient transfer has a long and trouble free operating life which is not interrupted by the plugging and fouling of valves, or the binding or freezing of sliding pistons or the like.

In processes where a liquid is made to flow under pressure, only a relatively small amount (about 20%) of the total energy input is consumed in pressurizing the liquid, the bulk of the energy being used instead to maintain the fluid in flow under pressure. For this reason, continuous flow operation requires much greater energy consumption than non-flow pressurization.

In some industrial processes, elevated pressures are required only in certain parts of the operation to achieve the desired results, following which the pressurized fluid is depressurized. In other processes, some fluids used in the process are available at high pressures and others at low pressures, and it is desirable to exchange pressure energy between these two fluids. As a result, in some applications, great improvement in economy can be realized if pressure exchange can be efficiently transferred between two liquids or between pumpable slurries of liquid-solid mixtures.

By way of illustration, a specific process of this type is the exchange crystallization process for effecting desalination of sea water, or other saline aqueous solutions. In this process, a slurry of ice and an exchange liquid, such as a hydrocarbon, is placed under extreme pressure in order to reverse the order of freezing so that the ice crystals melt, and the exchange liquid is partially frozen. Following this step of the desalinization process, the water from the melting of the ice is separated from the hydrocarbon, which is in the form of a slurry of solid hydrocarbon particles with the liquid hydrocarbon, and the separated phases are then depressurized to near atmospheric pressure. The economy with which the exchange crystallization desalination process can be practiced is directly dependent upon the efficiency with which the energy input to the process upon pressurization of the ice-exchange liquid system can be recovered after separation of the water-exchange liquid phases.

Another example where a pressure exchange engine finds application is in the production of potable water using the reverse osmosis membrane process. In this process, a feed saline solution is pumped into a membrane array at high pressure. The input saline solution is then divided by the membrane array into super saline solution (brine) at high pressure and potable water at low pressure. While the high pressure brine is no longer useful in this process as a fluid, the pressure energy that it contains has high value. A pressure exchange engine is employed to recover the pressure energy in the brine and transfer it to feed saline solution. After transfer of the pressure energy in the brine flow, the brine is expelled at low pressure to drain.

Accordingly, pressure exchangers of varying design are well known in the art. U.S. Pat. No 3,431,747 to Hashemi et al. teaches a pressure exchanger for transfer of pressure energy from a liquid flow of one liquid system to a liquid flow of another liquid system. This pressure exchanger comprises a housing with an inlet and outlet duct for each liquid flow, and a cylindrical rotor arranged in the housing and adapted to rotate about its longitudinal axis. The cylindrical rotor is provided with a number of passages or bores extending parallel to the longitudinal axis and having an opening at each end.

A ball is inserted into each bore for separation of the liquid systems. The ball movement is limited due to the use of a seat at each end of the passages. The seats cause a reduction in cross-area of the bores and are susceptible to wear and eventual failure. A more significant problem with this invention however, is that the bores of the cylindrical rotor line up with respective outlet ports for a very limited time. In this arrangement, fluid flow is not continuous, but is rather shut off and on as the cylindrical rotor spins. This results in very low efficiency as well as increased mechanical wear of the various parts due to pressure transients in the system.

In an attempt to improve the overall efficiency of this type of pressure exchanger, a modified pressure exchanger for liquids can be found in U.S. Pat. No. 4,887,942 to Hauge. Similar to the pressure exchanger found in Hashemi, a cylindrical rotor is spun inside a housing for the communication of pressure energy between a low and high pressure liquid source. Located in the rotor is an array of longitudinally running passages for the communication of the flowing liquid to inlet and outlet ports. The inlet and outlet ports of the Hauge pressure exchanger however is comprised of two semi-circular shaped ducts that allow for the almost continuous flow of liquid from the passages to the ducts. Allowing for the almost continuous, uninterrupted flow of liquid increases the pressure exchanger efficiency as well as reduces wear and tear on the mechanical components connected to the device.

Referring to FIG. 1 which shows a cross-sectional view of the Hauge invention, a major drawback of the Hauge invention is the reduction in sealing surface-area between the inlet and outlet ports. The two semi-circular ducts are separated by a very thin wall, thereby requiring extremely tight fitting components to ensure an acceptable level of sealing and the prevention of pressure loss between the high and low pressure ports. Leakage between these two ports results in reduced efficiency of the pressure exchanger, and as the tight tolerances of the mechanical components begin to wear, leakage between the ports will only increase and require costly maintenance.

There therefore is a need for a pressure exchanger which provides both smooth and uninterrupted fluid exchange as well as enhanced sealing capability thereby reducing the amount of leakage that occurs between the high and low pressure ports.

SUMMARY OF THE INVENTION

The primary objective of the present invention is to provide a device for efficiently transferring the energy of pressurization from a pressurized fluid to a second fluid at a lower pressure.

Another object of the present invention is to provide a device for efficiently transferring the energy of pressurization from a pressurized fluid to a second fluid at a lower pressure which exhibits enhanced sealing properties between the two pressurized fluids.

Yet another object of the present invention is to provide a pressure exchanger that allows for an almost continuous flow of fluids thereby increasing overall efficiency as well as reducing deleterious transients within the pressure exchanger.

Still another object of the present invention is to provide a pressure exchanger that has reduced maintenance costs and an increased usable life.

Yet another object of the present invention is to provide a device that allows for the exchange of pressure energy between two fluids with the use of conventional in line valving.

In addition to the described objects and advantages of the present invention, additional objects and advantages will become apparent as the following detailed description of the invention is read in conjunction with the accompanying drawings.

DETAILED DESCRIPTION OF THE PREFERRED EMBODIMENTS

Figure 1:
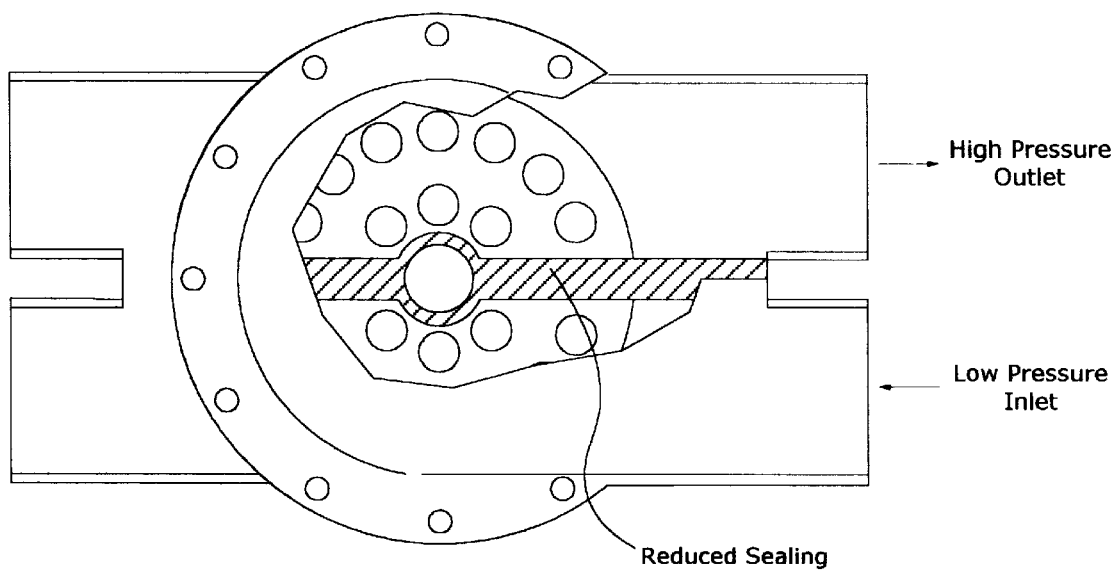
FIG. 1 is a cross-sectional view of a pressure exchange apparatus in accordance with the prior art.
Figure 2:
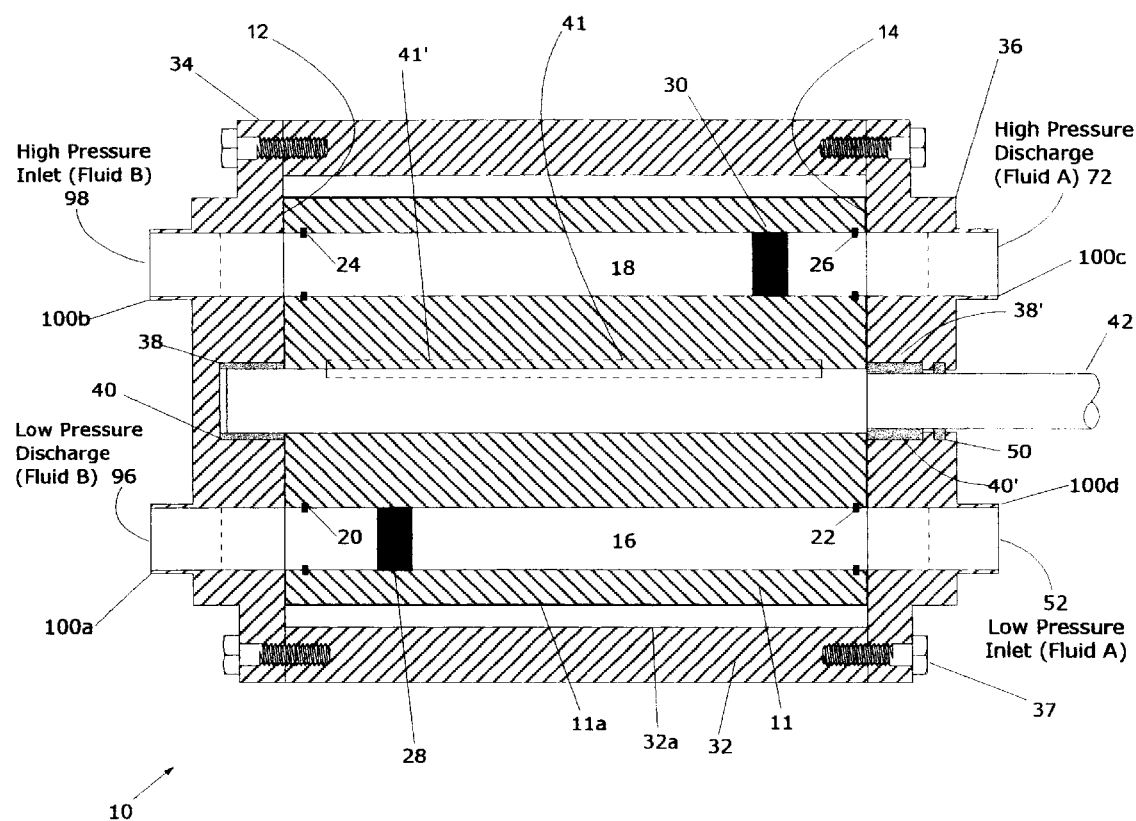
FIG. 2 is a simplified cross-sectional view of the present invention.

Referring first to FIG. 2, a preferred embodiment 10 of the pressure exchange apparatus in accordance with the present invention is generally shown. A solid cylindrical rotor 11 which has a pair of spaced end faces 12 and 14. Extending through the rotor 11 in an axial direction is at least one bore. In the preferred embodiment, and not by limitation, the bore is cylindrical, but could be of almost any shape. In FIG. 2, two of the axially extending bores are depicted, and are designated by reference numeral 16 and 18. As shown, the bores 16 and 18 each open at their opposite ends in the two end faces 12 and 14.

Pressed into the two ends of each of the bores 16 and 18 are stops. The stops at the opposite ends of the elongated, axially extending bore 16 are designated 20 and 22, and those at the opposite ends of the axially elongated bore 18 are designated by numerals 24 and 26. A small cylinder or separator 28 is slidably mounted in axial bore 16, and a similar small cylinder or separator 30 is slidably mounted in the bore 18. In the preferred embodiment, the separators 28 and 30 may be constructed of any hard, rigid and wear resistant material. The separators 28 and 30 are not necessarily required, and can be removed depending on the process requirements and the liquids employed in the system.

Surrounding and enclosing cylindrical rotor 11 in a circumferential manner is a cylindrical housing 32. The cylindrical housing 32 has a radially inner cylindrical wall 32a which is preferably positioned closely adjacent but out of contact with the outer peripheral wall 11a of the rotor 11. A pair of generally cylindrical, relatively thick closure plates 34 and 36 are secured by axially extending fasteners 37 to cylindrical housing 32. Rotor 11 is thus rotatably and sealing contained in cylindrical housing 32 and closure plates 34 and 36.

The closure plate 34 is provided with a central counter bore 38 in which is mounted an annular bearing 40 for journaling a portion of a central shaft 42 which is provided coaxially to rotor 11. Intermediate the other distal end of the shaft 42 is another bore 38' in closure plate 36 in which is mounted another annular bearing 40' for journaling another portion of the central shaft 42. A keyway 41 and key 41' is provided between the shaft 42 and the rotor 11 for the transmission of torque from the shaft 42 to the rotor 11. A seal 50 is provided in closure plate 36 around shaft 42 for the prevention of fluid leakage. The extending and exposed portion of the shaft 42 is adapted to be connected to a suitable source of power such as an electric motor or the like (not illustrated).

An elongated low pressure fluid inlet passageway 52 extends through the closure plate 36 in a predetermined direction in relation to bore 16 and is directed to a single circular port 110d. As shown in FIG. 2, a second high-pressure discharge passageway 72 is provided in the closure plate 36, disposed 180 degrees from the passageway 52, also directed to a single circular port 100c. Similarly, a low pressure fluid discharge passageway 96 and a high pressure fluid inlet passageway 98 are provided in closure plate 34. Each of these passageways are also directed to a single circular port 100a and 100b respectively for connection of a hose or the like (not shown).

It will be noted that the open ports or passageways 52 and 72 (in the case of closure plate 36), and the open ports or passageways 96 and 98 (in the case of closure plate 34) are located so as to be in alignment with the axially extending bores 16 and 18 through the rotor 11 when the rotor is in the position depicted in FIG. 2. Of course, as the rotor 11 is driven in rotation by power applied to the shaft 42, the axial bores 16 and 18 are moved out of alignment with the respective passageways. The openings to each end of each axially extending bore 16 and 18 are disposed on the same circular paths or at the same radius from the shaft 42 as the passageways in closure plates 34 and 36. Thus, the high pressure and low pressure fluid inlet and fluid discharge passageways which are provided through the closure plates 34 and 36 are successively brought into alignment with the axially extending bores 16 and 18. Through the rotor 11 at such time as the rotor is driven in rotation.

Still referring to FIG. 2., the operation of the pressure exchange apparatus in accordance with the present invention will now be described. Let's assume that two process fluids which will be called fluid A and fluid B are available in an industrial process at pressures P2 and P1, respectively. Let it be assumed that the pressure P1 of fluid B is substantially greater than the pressure P2 of fluid A.

With a source of fluid A at pressure P2 available, this source is connected to the low pressure fluid inlet passageway 52 in closure plate 36 so that fluid A at pressure P2 may enter this passageway. The passageway 96 through the closure plate 34 is connected to a relatively low pressure zone. The high pressure inlet passageway 98 is connected by a pipe (See FIG. 2) or other suitable means to a source of high pressure fluid B which is maintained at pressure P1. Finally, the high pressure discharge passageway 72 is connected to suitable fluid confining means which can retain a fluid under pressure, and can permit fluid under pressure to be pumped thereinto from the high pressure fluid discharge passageway 72.

With these connections made to the several fluid passageways through the closure plates 34 and 36, the depicted structure can be utilized for efficiently transferring substantially all of the pressure energy from the high pressure fluid B to the relatively low pressure fluid A. Having set the rotor 11 in rotational motion by energizing a motor or other suitable prime mover connected to shaft 42, the axial bores 16 and 18 formed in the rotor 11 are, in consecutive sequence, brought into axial alignment with passageways 52 and 96, and then 72 and 98 formed in the closure plates 34 and 36.

Thus, at the instant in the operation of the apparatus which is represented by the positions of the elements shown in FIG. 2, the rotor has been rotated to a position in which the axially extending bore 16 is aligned with the passageways 52 and 96. Concurrently, the bore 18 has aligned with the passageways 72 and 98. At this time, the relatively low pressure fluid A at pressure P2 enters the bore 16 to the right of separator 28 via the low pressure fluid inlet passageway 52. At the same time, some of fluid B which has been previously entrapped in the part of bore 16 to the left of the separator 28 is placed in communication with a vent or low pressure environment and can be discharged through discharge passageway 96 as the separator 28 is displaced to the left in bore 16 by the impress of the relatively low pressure fluid A entering the right side of this bore.

In the case of the axially extending bore 18, as shown in FIG. 2, relatively high pressure liquid B at pressure P1 is entering the left side of this bore from the high pressure inlet passageway 98, and drives the separator 30 toward the right. This displaces the entrapped fluid A which is disposed in the right side of the bore 18 as a result of its entry into this bore at a previous time when the bore 18 occupied the position shown as occupied by bore 16 in FIG. 2. This occurred of course, at a time earlier in the rotational movement of rotor 11. Continued communication of the high pressure fluid B upon the left side of the separator 30 eventually drives separator 30 to the right side of the bore 18, and completely displaces the relatively low pressure fluid A from this bore at a pressure which is only slightly less than that of the high pressure fluid B.

It may thus be seen that as rotor 11 continues to rotate, the net effect is that, in being depressured from its elevated pressure P1, to atmospheric pressure, the high pressure fluid B is made to transfer efficiently its energy of pressurization to the relatively low pressure fluid A. The transfer is highly efficient due to the minimum energy required to displace the separators 28 and 30 in their respective bores without the use of valving which may choked or clogged. Thus, relatively thick slurries of high solids content can be successfully passed through the pressure exchange apparatus.

Figure 3:
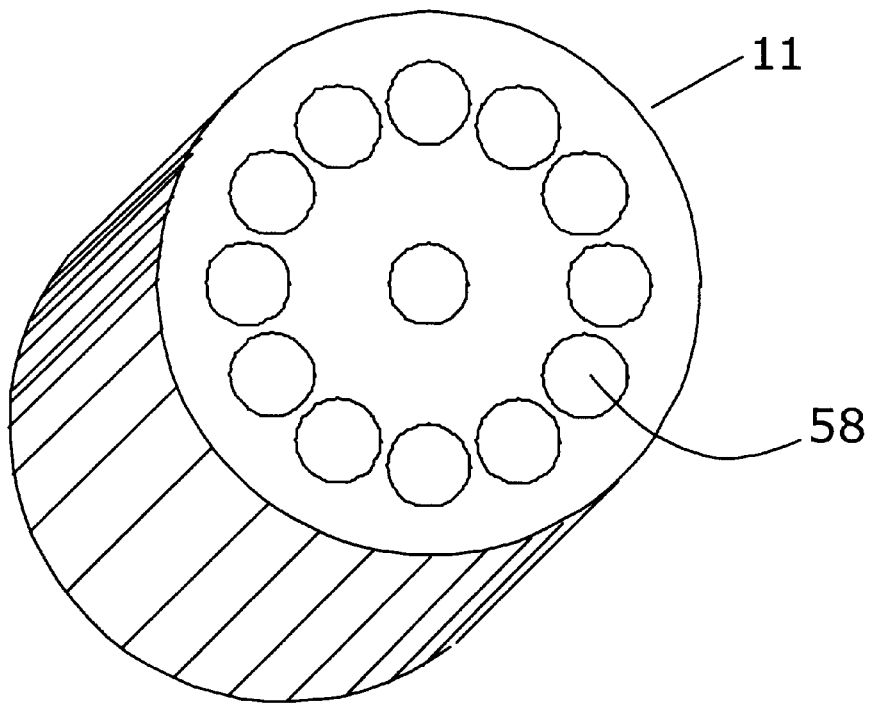
FIG. 3 and FIG. 4 are isometric views of rotors in accordance with the present invention.
Figure 4:
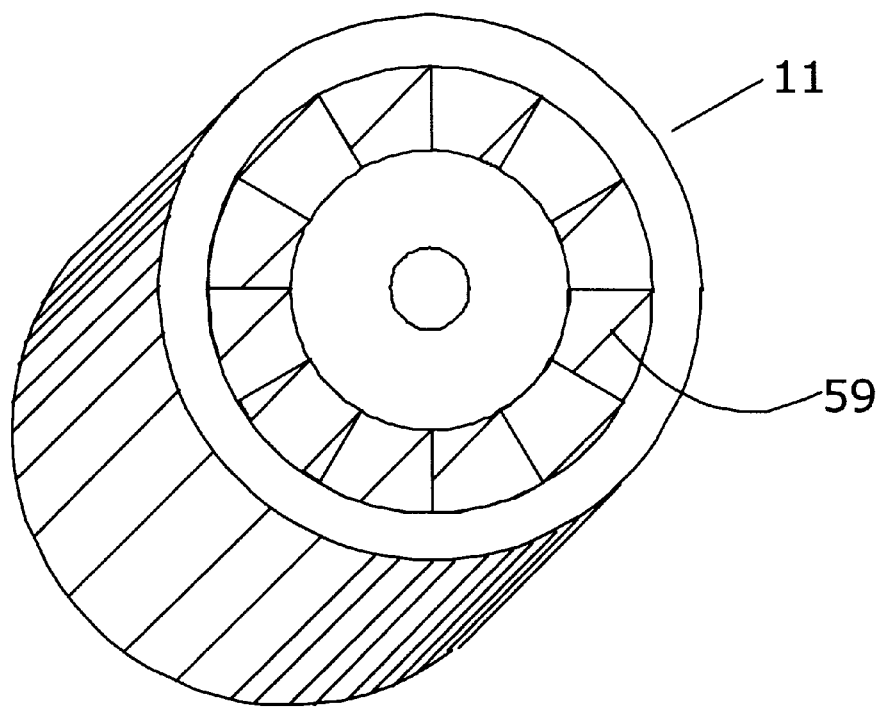

Referring to FIGS. 3 and 4, rotor 11 is provided with cylindrically shaped axial bores 58 or substantially arc-segment shaped axial bores 59. The present invention contemplates all such shapes of bores for fluid transmission through rotor 11. Naturally, if required, separators 28 and 30 would be formed to slidably engage and seal the axial bores.

Figure 5:
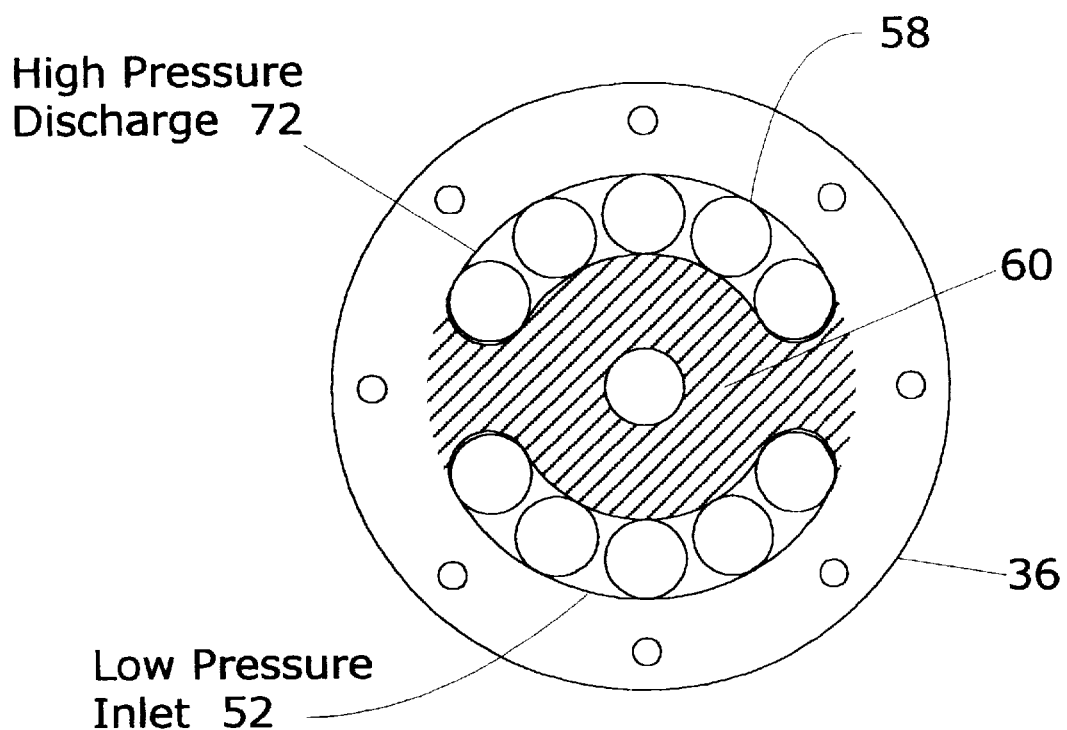
FIG. 5 and FIG. 6 are sectional views through the closure plates showing various configurations of the inlet and outlet ports superimposed over the example rotor duct shapes.
Figure 6:
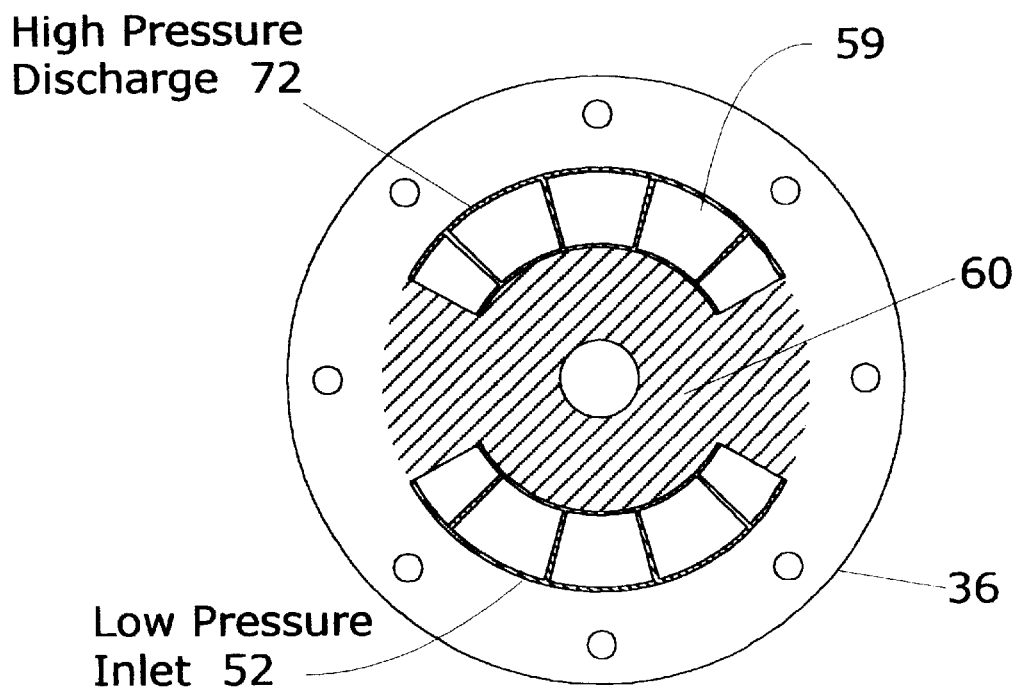

Referring to FIGS. 5 and 6, the high pressure discharge port elongated passageway 72 extending through the closure plate 36 in a direction substantially parallel with the bore 16 is shown. Also shown is the low-pressure inlet passageway 52 disposed diametrically opposed from the passageway 72. As shown, the passageways 52 and 72 are essentially swept areas of the bores 16 or 18 located in rotor 11. In this configuration, more than a single bore in rotor 11 is in fluid communication with a respective passageway. This increases overall apparatus efficiency as well as reduces pressure transients that occur as a result of starting and stopping the flow of liquids.

These elongated passageways would also need to be provided in closure plate 34 so that the fluids may be equally communicated through the plurality of axial bores in rotor 11.

An increased sealing surface as shown by hatched area 60 is provided between the high pressure discharge passageway 72 and the low pressure inlet passageway 52.

This increased sealing surface substantially reduces or eliminates fluid leakage between the ports and increases apparatus efficiency.

Figure 7:
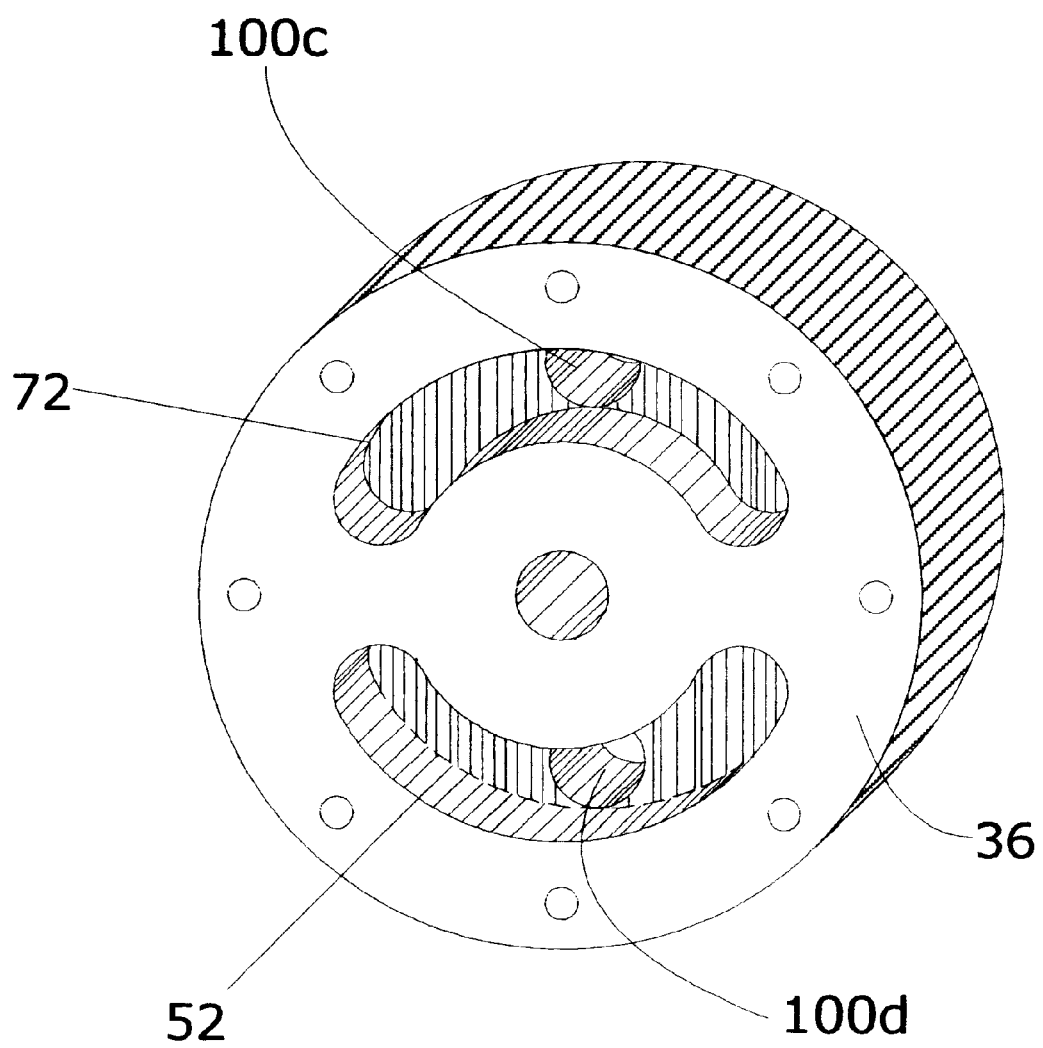
FIG. 7 is an isometric view of a closure plate showing the circular ports.

Referring now to FIG. 7, the closure plate 36 is shown isometrically to reveal the relationship of the passageways 52 and 72 with the circular ports 100d and 100c respectively. As shown in the figure, fluid entering passageway 52 is directed to flow through circular port 100d, which provides an easy means for securing a typical cylindrical member such as a hose or a tube to the apparatus. Similarly, fluid in passageway 72 is directed to circular port 100c for further communication to a hose or the like.

It is to be understood that the invention is not limited to the illustrations described herein, which are deemed to illustrate the best modes of carrying out the invention, and which are susceptible to modification of form, size, arrangement of parts and details of operation. For example, more than one elongated passageway at a different radius could be provided to increase the throughput of the apparatus. Variations and modifications of the passageway locations and sizes are fully contemplated by the present invention. The invention is intended to encompass all such modifications, which are within its spirit and scope as defined by the claims.

What is claimed is:

1. A pressure exchange apparatus for transferring the energy of pressurization between two fluids, wherein one fluid is at a relatively higher pressure than the other, comprising:

a rotatably mounted cylindrical rotor having a pair of spaced apart end faces, having at least one bore extending axially therethrough with each of said bores having an opening at each end thereof with said openings located in said planar end faces;

a pair of closure plates rigidly affixed to said end faces of said rotor, and slidingly and sealing engaging said end faces, and each having at least one elongated fluid inlet passageway and at least one elongated fluid discharge passageway in each said closure plate, said passageways being positioned so that a fluid inlet passageway in one of said closure plates is aligned with a plurality of said bores in said rotor at such time during the rotation of said rotor as a fluid discharge passageway in the other said closure plates is aligned with the same plurality of said bores, said fluid inlet passageways and said fluid discharge passageways being constantly sealed from each other during the operation by a sealing area, and said bore openings and said passageways being positioned in their respective surfaces so that during rotation of said rotor, said openings at the end of each bore are, in alternating sequence, brought into concurrent alignment with an inlet passageway at one end of the respective bore and a discharge passageway at the other end of the respective bore, and then, at a different time, into concurrent alignment with a discharge passageway at said one end of the respective bore and an inlet passageway opening at said other end of the respective bore, and a motive force for cyclically rotating said rotor relative to said closure plate so that each of said bore openings periodically moves through the same path to repeatedly effect said alternating sequence of alignment of said bores with said passageways.

2. A pressure exchange apparatus in accordance with claim 1 further comprising a freely slidable separator positioned in each of said bores of said rotor to sealingly divide each bore into a pair of chambers.

3. A pressure exchange apparatus in accordance with claim 1 wherein said sealing area is defined by an area of close fit between said rotor and each said closure plate.

4. A pressure exchange apparatus in accordance with claim 3, wherein said sealing area is defined by an enlarged, predetermined contact area between said elongated passageways in said closure plates, thereby substantially eliminating leakage along said closure plates.

5. The pressure exchange apparatus of claim 1, wherein each said elongated passageway is defined by a swept area of said bores so that at least one of said bores may be aligned with each said elongated passageway at a given time.

6. The pressure exchange apparatus of claim 1, wherein said bores have a cylindrical cross-section.

7. The pressure exchange apparatus of claim 1, wherein said bores have an arc-segment cross-section.

8. The pressure exchange apparatus of claim 1, further comprising a housing around said rotor secured to said closure plates thereby maintaining sliding and sealing alignment of said rotor with said closure plates.

9. The pressure exchange apparatus of claim 1, further comprising:

a shaft, coaxially inserted and affixed to said rotor specifically adapted for connection to said motive force;

a bearing in one of said closure plates for receipt of a distal end of said shaft; and another bearing in the other of said closure plates for receipt of said shaft at an intermediate position along said shaft.

10. The pressure exchange apparatus of claim 1 further comprising a sealing and lubricating material positioned between said rotor and said closure plates.

11. The pressure exchange apparatus of claim 1 wherein the minimum radial separation between each said passageway in each said closure plate is greater than said bores to preclude the chance of a single said bore to be in fluid communication with both said passageways at the same time.

12. The pressure exchange apparatus of claim 1 wherein each said elongated passageway is in fluid communication with a single circular port for connection to a fluid communication device.

13. The pressure exchange apparatus of claim 12, wherein each said circular port is formed integral to said closure plates.

14. The pressure exchange apparatus of claim 12, wherein each said fluid communication device is one selected from the group consisting of a hose, tube and duct.

* * * * *